(12) United States Patent
Evans et al.

(10) Patent No.: US 9,170,137 B2
(45) Date of Patent: Oct. 27, 2015

(54) ROTATABLE ORIFICE PLATE FOR DIRECT FLOW MEASUREMENT

(71) Applicant: Fluid Handling LLC, Morton Grove, IL (US)

(72) Inventors: Stanley P. Evans, Tinley Park, IL (US); Florin Rosca, Niles, IL (US); Mahesh Nair, Evanston, IL (US); Amit Welekar, Gujarat (IN)

(73) Assignee: FLUID HANDLING LLC., Morton Grove, IL (US)

( * ) Notice: Subject to any disclaimer, the term of this patent is extended or adjusted under 35 U.S.C. 154(b) by 22 days.

(21) Appl. No.: 14/164,423

(22) Filed: Jan. 27, 2014

(65) Prior Publication Data

US 2014/0311254 A1    Oct. 23, 2014

Related U.S. Application Data

(63) Continuation of application No. 13/681,628, filed on Nov. 20, 2012, now Pat. No. 9,016,140.

(60) Provisional application No. 61/756,814, filed on Jan. 25, 2013.

(51) Int. Cl.
| G01F 1/42 | (2006.01) |
| G01F 1/40 | (2006.01) |
| G01F 1/44 | (2006.01) |
| G01F 15/00 | (2006.01) |
| F16K 5/06 | (2006.01) |

(52) U.S. Cl.
CPC ............... *G01F 1/42* (2013.01); *F16K 5/0605* (2013.01); *G01F 1/40* (2013.01); *G01F 1/44* (2013.01); *G01F 15/005* (2013.01)

(58) Field of Classification Search
None
See application file for complete search history.

(56) References Cited

U.S. PATENT DOCUMENTS

| 1,569,305 A | 1/1926 | Robinson |
| 2,574,198 A | 11/1951 | Stevenson |
| 2,764,891 A | 10/1956 | McGowen, Jr. |
| 3,805,612 A | 4/1974 | Shiba |
| 3,817,099 A | 6/1974 | Bubniak et al. |
| 4,317,374 A | 3/1982 | Casey |
| 4,375,169 A | 3/1983 | Torresin |
| 4,562,744 A | 1/1986 | Hall et al. |

(Continued)

FOREIGN PATENT DOCUMENTS

JP      56043509        4/1981

OTHER PUBLICATIONS

JP56043509 English Language Abstract, 1 page.

*Primary Examiner* — Harshad R Patel

(57) ABSTRACT

A valve is provided having a valve housing/body configured to be arranged in, or form part of, a piping having a fluid flow, and configured with a pressure tap arranged at a location along the piping to allow pressure of the fluid flow of the piping to be measured, and also having a rotatable orifice plate configured to rotate in the valve body/housing on an axis of rotation positioned at a different location along the piping than the pressure tap for rotating between a first rotatable position for providing a normal fluid flow operation and a second rotatable position substantially perpendicular to the fluid flow for providing a direct flow measurement of the fluid flow determined based on signaling sensed by the pressure tap sensor containing information about a measured pressure at the pressure tap when the orifice plate is in the second rotatable position.

17 Claims, 11 Drawing Sheets

(56) References Cited

U.S. PATENT DOCUMENTS

| | | |
|---|---|---|
| 4,750,370 A | 6/1988 | Ossyra |
| 4,938,077 A | 7/1990 | Robinet |
| 4,957,006 A | 9/1990 | Harter |
| 4,993,269 A | 2/1991 | Guillaume et al. |
| 5,313,980 A | 5/1994 | Carlson |
| 5,483,838 A | 1/1996 | Holden |
| 5,533,549 A | 7/1996 | Sherman |
| 5,685,240 A | 11/1997 | Briggs, Jr. et al. |
| 6,053,055 A | 4/2000 | Nelson |
| 6,843,138 B2 | 1/2005 | Pollard |
| 6,923,074 B2 | 8/2005 | Cipolla et al. |
| 2008/0307896 A1 | 12/2008 | Ifft et al. |
| 2010/0132339 A1 | 6/2010 | Barkhage |
| 2011/0283810 A1 | 11/2011 | Hoefelmayr |

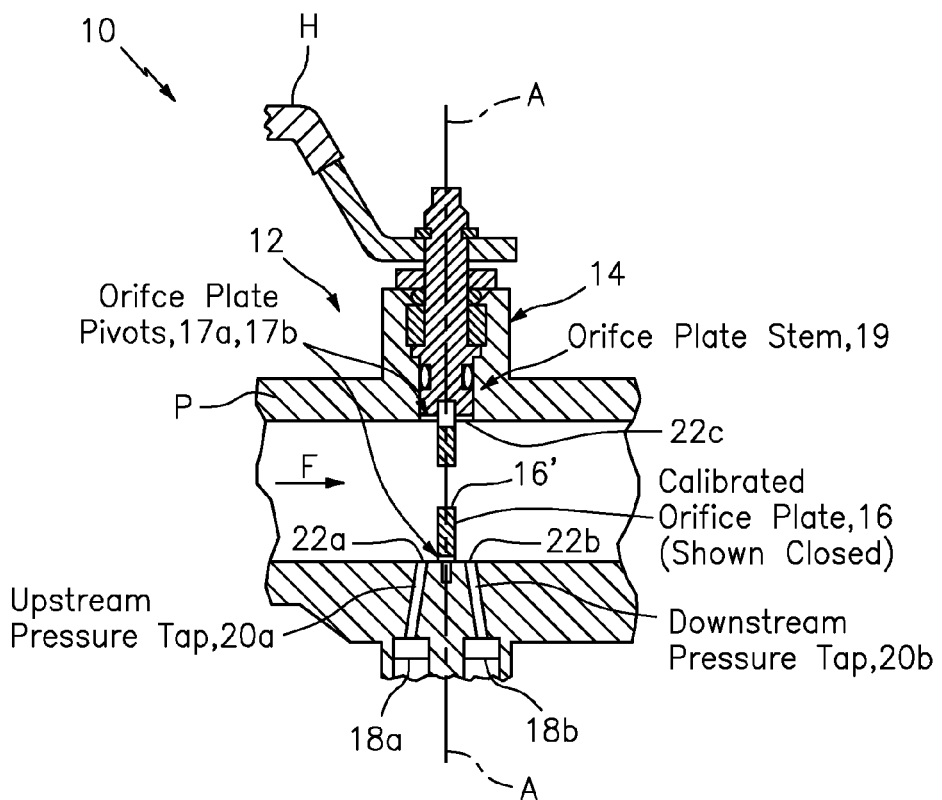
*FIG. 1a*
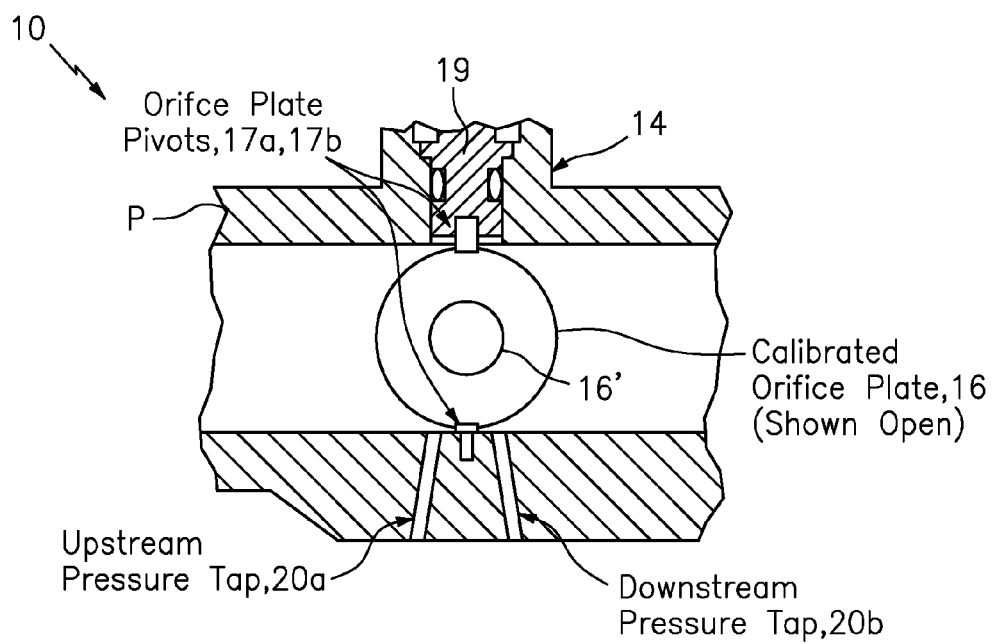
*FIG. 1b*
*FIG. 1*

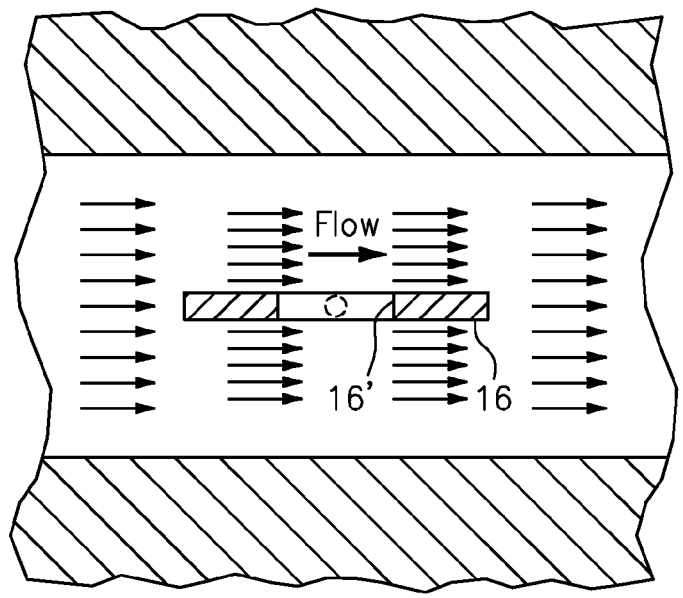
FIG. 2a
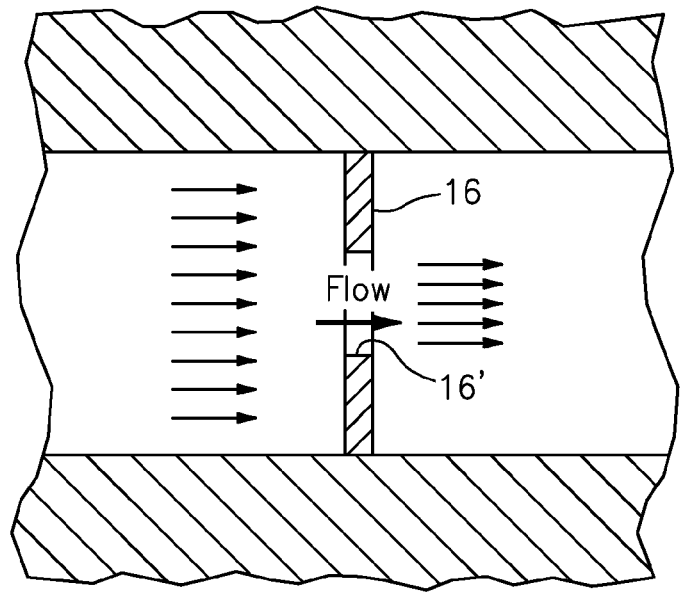
FIG. 2b
FIG. 2

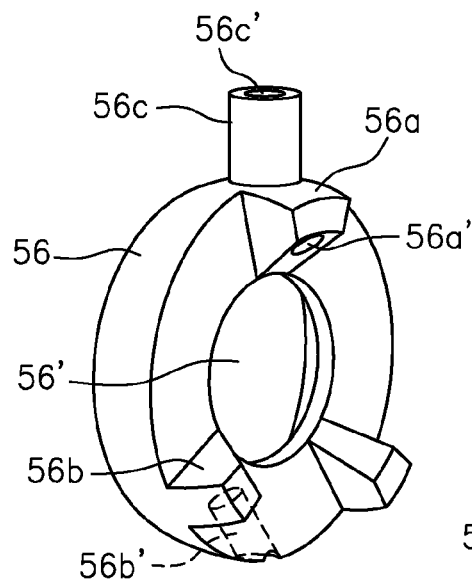
FIG. 8a
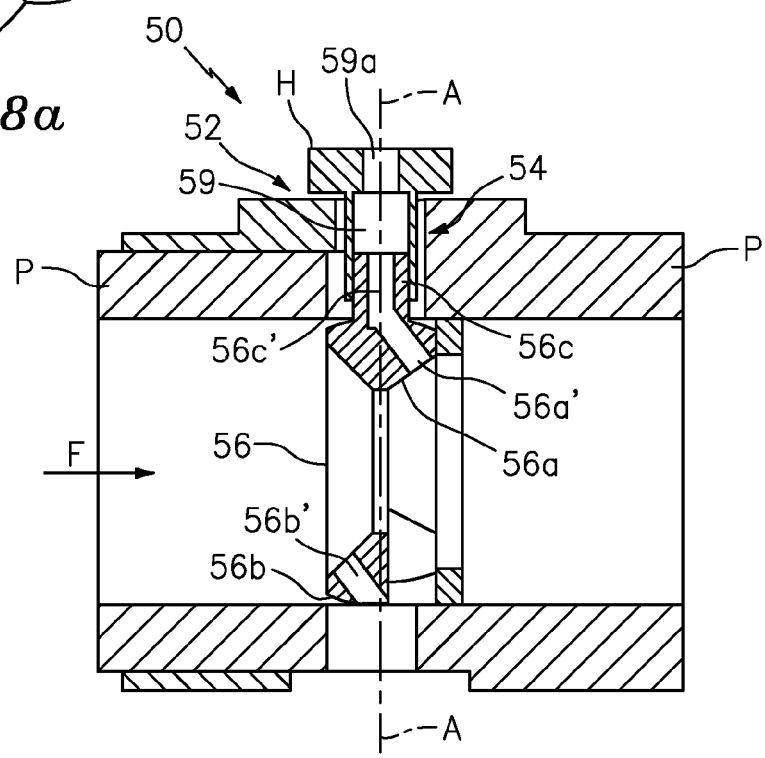
FIG. 8b
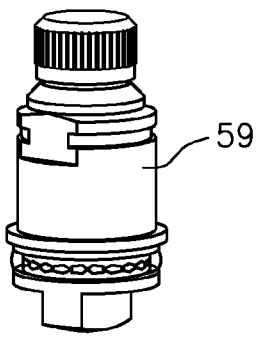
FIG. 8c
FIG. 8

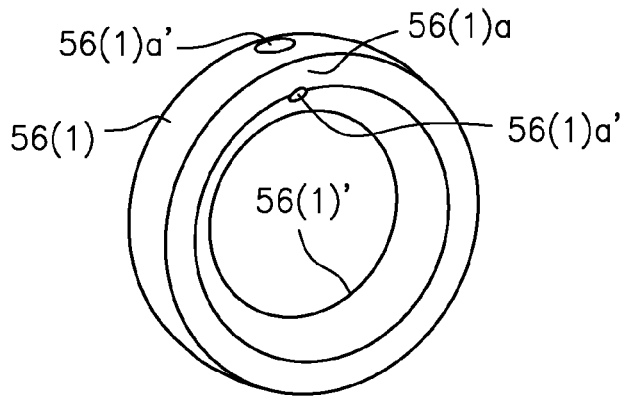
FIG. 9a
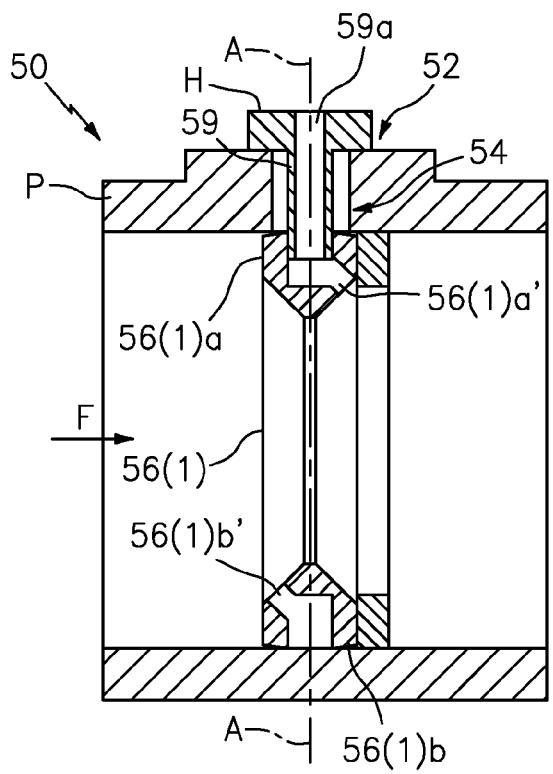
FIG. 9b
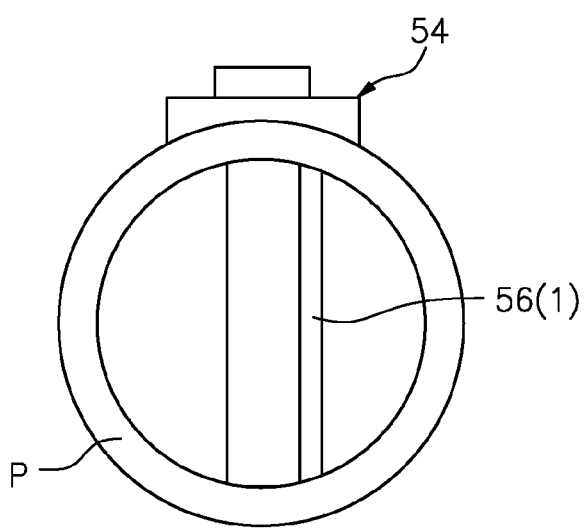
FIG. 9c
FIG. 9

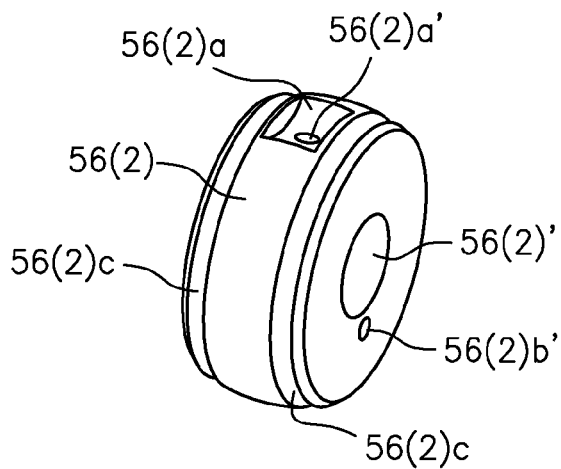
FIG. 10a
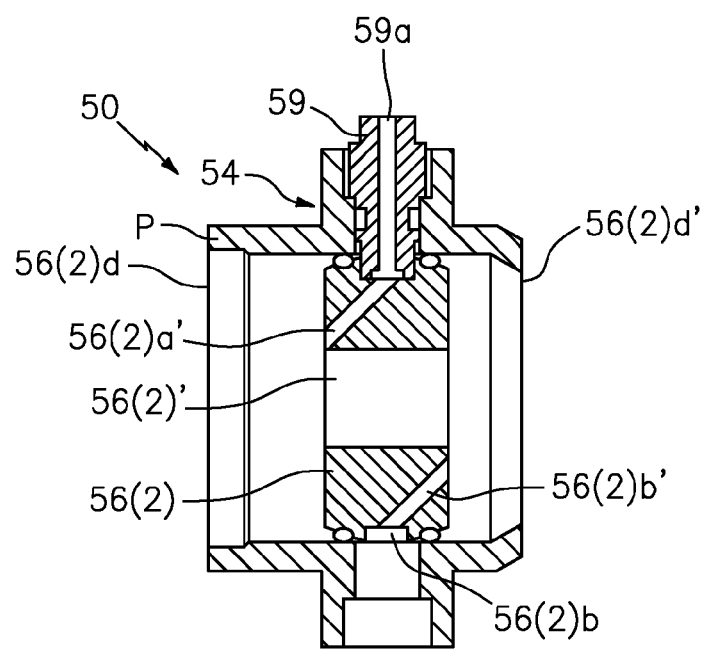
FIG. 10b
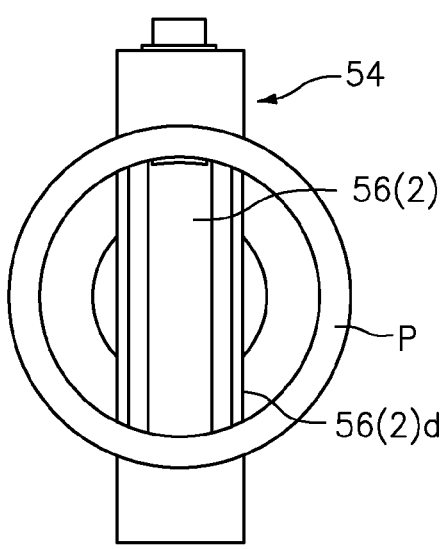
FIG. 10c
FIG. 10

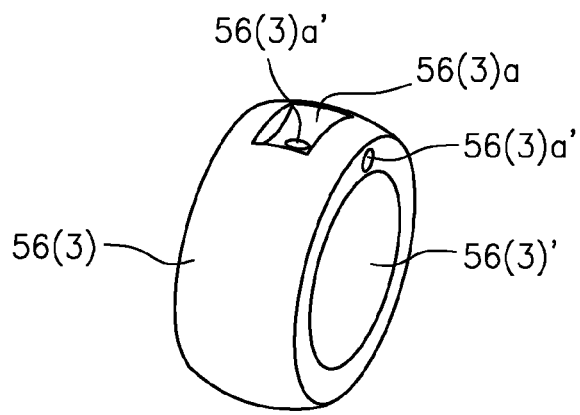
FIG. 11a
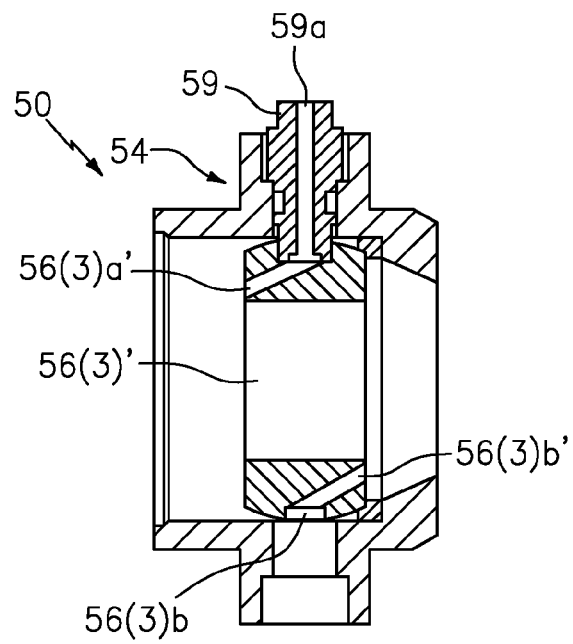
FIG. 11b
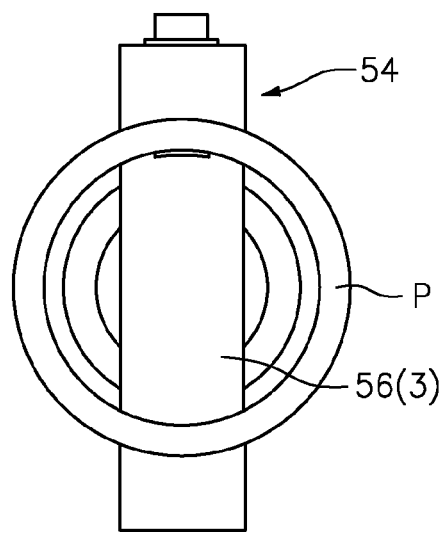
FIG. 11c
FIG. 11

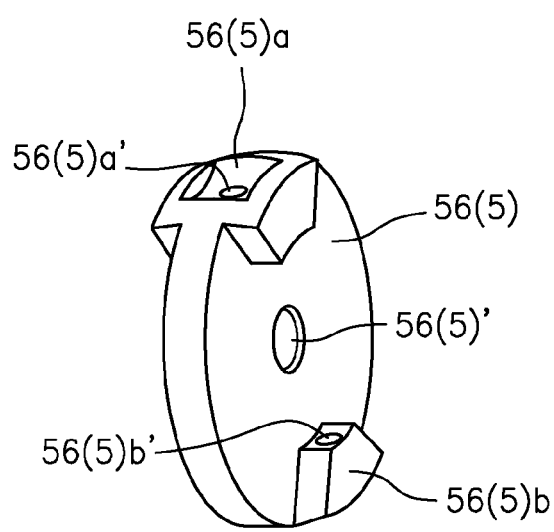
FIG. 13a
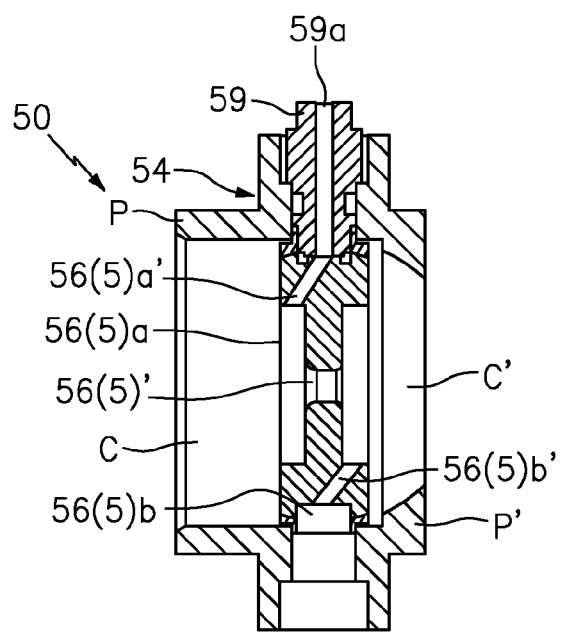
FIG. 13b
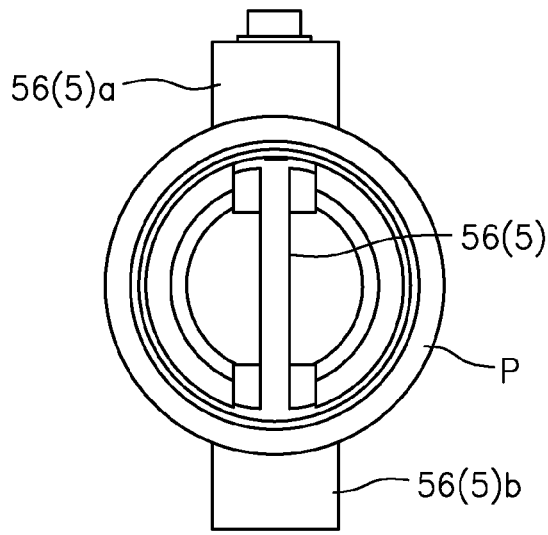
FIG. 13c
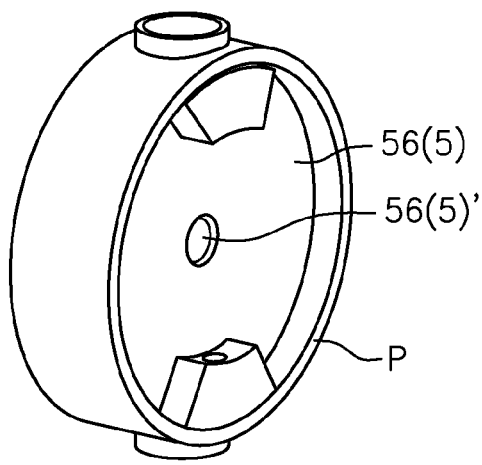
FIG. 13d
FIG. 13

Apparatus 10, 50

Upstream and downstream pressure tap sensors 18a, 18b configured to sense upstream and downstream pressure taps, and providing signaling containing information about the same Signal processor or processing module 100 configured at least to:

receive the signaling from the upstream and downstream pressure tap sensors 18a, 18b, determine the direct flow measurement of the fluid flow, based at least partly on the signaling received, and/or provide corresponding signaling containing information about the direct flow measurement of the fluid flow

FIG. 14

ROTATABLE ORIFICE PLATE FOR DIRECT FLOW MEASUREMENT

CROSS-REFERENCE TO RELATED APPLICATIONS

This application claims benefit to provisional application Ser. No. 61/756,814, filed 25 Jan. 2013, which is hereby incorporated by reference in its entirety.

This application is also a continuation-in-part of, and claims benefit to, application Ser. No. 13/681,628, filed 20 Nov. 2012, which is hereby incorporated by reference in its entirety.

BACKGROUND OF THE INVENTION

1. Field of the Invention

The present invention relates to a technique for providing a direct flow measurement; and more particularly, the present invention relates to a valve configured for providing a direct flow measurement.

2. Brief Description of Related Art

Presently, most known systems where a fluid flows at a constant rate require a separate permanent flow measurement device to verify the system flow rate. These additional components in the system take up extra space and increase the head loss in a pressure dependent system. Significant amounts of extra pipe length may be required depending on the type of flow measurement device being used. Permanent flow measurement devices in fluid flow systems are also subject to scale or suspended matter build up.

SUMMARY OF THE INVENTION

The present invention provides for a new and unique technique, device or feature that enables a direct fluid flow measurement to be obtained through an orifice plate that can be temporarily employed in any system with a means of pressure independent flow regulation and requiring constant flow.

The present invention, which incorporates temporary direct flow measurement in a fluid flow system and reduces the overall amount of components needed in the system when used in conjunction with a pressure independent flow control device, provides one temporary head loss location when determining overall system head loss requirements, as the changes in pressure drop caused by employing the rotatable orifice when measuring flow are compensated by the differential pressure regulator of the pressure independent flow control device. The temporary nature of the rotatable orifice plate prevents scale or matter from collecting in the device and eliminates the need for maintenance to clean or replace a fixed orifice device.

The present invention includes an orifice plate used for flow measurement that can be rotated perpendicularly into or out of the path of flow if desired by the operator. The operator can rotate the orifice plate into the flow path to use the device as a momentary means of flow measurement to verify the volumetric rate of fluid flow through the device. When used in conjunction with a pressure independent flow control device downstream, the momentary pressure drop incurred when the orifice plate is engaged will be compensated by the pressure regulator within the pressure independent flow control device, maintaining constant fluid flow in the system. When flow measurement is complete, the operator can rotate the orifice plate out of the flow path.

The orifice plate may be installed in the device via pivots along a desired axis of rotation. A handle or dial would control the rotation of one pivot, which would in turn control the position of the orifice plate. The orifice plate may have a fixed calibrated inner diameter. Pressure taps may be located immediately upstream and downstream of the orifice plate, and will be sensed and used to determine upstream and downstream pressures, respectively. Port features in the device body or housing will allow the pressure taps to be measured. Flow may be determined by applying the measured pressure differential between the upstream and downstream taps in relation to the flow coefficient of the calibrated orifice plate, when it rotated into position, perpendicular to the flow.

An alternate embodiment may include separate interchangeable orifice inserts that could allow different flow rates and conditions to be measured. The orifice itself can be eccentric to the diameter of the plate perpendicular in the fluid flow in accordance with the type of fluid flowing in the system. Fluids with high concentrations of particulates may require that an eccentric orifice be used. Likewise, a segmental or quadrant radius type orifice could be used in this orifice plate.

Flow measurement could also occur using a flow nozzle or generalized nozzle in place of the fixed orifice. Either type of nozzle can also have the same effect. Flow would be similarly calculated with the flow coefficient changing to suit the design of the orifice or nozzle. The pressure taps could be in any orientation on the device. Use of a pressure independent flow control device, such as a pressure independent control valve or pressure independent flow limiter, ensures constant flow when the flow measurement device is engaged.

Another embodiment of the rotatable orifice plate may use an integrated port feature in the axis of the orifice plate to permit one of the pressure taps to be measured.

The rotatable orifice can be employed as its own device, or it can be incorporated into a pressure independent control valve or other flow control device.

EXAMPLES OF PARTICULAR EMBODIMENTS

According to some embodiments, the present invention may take the form of apparatus, such as a valve comprising a valve housing or body in combination with a rotatable orifice plate.

The valve body or housing may be configured to be arranged in, or form part of, a piping having a fluid flow, and also configured with at least one pressure tap arranged at at least one location along the piping to allow pressure of the fluid flow of the piping to be measured. The rotatable orifice plate having an orifice configured or formed therein, and configured to rotate in the valve body or housing on an axis of rotation positioned at a different location along the piping than the at least one pressure tap for rotating between a first rotatable position for providing a normal fluid flow operation and a second rotatable position substantially perpendicular to the fluid flow for providing a direct flow measurement of the fluid flow, so that the direct flow measurement of the fluid flow may be determined based at least partly on signaling sensed by at least one pressure tap sensor containing information about a measured pressure at the at least one pressure tap when the orifice plate is in the second rotatable position.

The present invention may include one or more of the following additional features:

The at least one pressure tap may include an upstream pressure tap at an upstream location along the piping to allow upstream pressure of the fluid flow of the pipe to be measured and a downstream pressure tap at a downstream location along the piping to allow downstream pressure of the fluid flow of the pipe to be measured, so that the direct flow measurement of the fluid flow may be determined based at least partly on the signaling sensed by upstream and downstream pressure tap sensors containing information about a measured pressure differential between upstream and downstream pressure taps in relation to the flow coefficient of the calibrated orifice when the orifice plate is in the second rotatable position.

The apparatus may include a signal processor or processing module configured at least to: receive the signaling from upstream and downstream pressure tap sensors, and determine the direct flow measurement of the fluid flow, based at least partly on the signaling received.

The axis of rotation of the orifice plate may be configured between upstream and downstream locations along the piping.

The he orifice plate may include an orifice plate stem having an integrated axial pressure tap configured therein along the axis of rotation to permit one pressure tap to be measured.

The orifice plate may include at least one integrated corresponding upstream or downstream tap configured therein; and the apparatus may include an orifice plate stem having an integrated axial pressure tap configured therein along the axis of rotation to permit the at least one integrated corresponding upstream or downstream tap to be measured.

The orifice plate may be configured as a ring-like structure having a thickness to substantially allow the fluid flow passed the orifice plate when rotated into the first rotatable position, the ring configured to form a calibrated orifice with a flow coefficient to allow the calibrated fluid flow through the orifice plate when rotated into the second rotatable position.

The apparatus may include an actuator, including a handle, configured to rotate the orifice plate between first and second rotatable positions.

The orifice plate may include, or takes the form of, separate interchangeable orifice inserts that are configured to allow different flow rates and conditions to be measured.

The orifice plate takes the form of a calibrated orifice plate that may be configured to be eccentric to the diameter of the orifice plate The eccentricity of the calibrated orifice plate may be based at least partly on, or in accordance with, a type of fluid flowing in the pipe, including where fluids with high concentrations of particulates may require that an eccentric orifice be used, including a segmental or quadrant radius type orifice.

The orifice plate may include, or take the form of, a flow nozzle or generalized nozzle.

The orifice plate may be configured with an integrated port in the axis of the orifice plate configured to permit at least one upstream or downstream pressure tap to be measured.

The orifice plate may include orifice plate members configured with corresponding upstream or downstream pressure taps in fluidic communication with the upstream and downstream pressure taps to determine the measured pressure differential.

The orifice plate may be configured with circumferential channels to allow fluid flow when the orifice plate in the first rotatable position for providing the normal fluid flow operation.

The apparatus may include a signal processor or processing module configured at least to: receive the signaling from the upstream and/or downstream pressure tap sensors, and determine the direct flow measurement of the fluid flow, based at least partly on the signaling received.

One advantage of the present invention is that it provides for a feature that enables direct flow measurement to be obtained through a valve in any system where there is fluid flowing. The present invention, which incorporates direct flow measurement in the sealing body or valve ball of the isolation valve reduces the overall amount of components needed in the system, and provides one head loss location when determining overall system head loss requirements, and positive shut-off.

BRIEF DESCRIPTION OF THE DRAWING

The drawing includes the following Figures, not drawn to scale:

FIG. 1 includes FIGS. 1a and 1b showing cross-section views of a valve having a valve body or housing configured to be arranged in, or form part of, piping, where FIG. 1a shows the valve configured in relation to lower upstream and downstream pressure taps in the piping, and also shows a calibrated orifice plate pivoted perpendicular (closed) to the direction of fluid flow, and where FIG. 1b shows the calibrated orifice plate in FIG. 1a pivoted parallel (open) to the direction of fluid flow, both according to some embodiments of the present invention.

FIG. 2 includes FIGS. 2a and 2b, where FIG. 2a is a diagram of the calibrated orifice plate shown in FIG. 1a pivoted perpendicular (closed) to the direction of fluid flow, and where FIG. 2b is a diagram of the calibrated orifice plate in FIG. 1b pivoted parallel (open) to the direction of fluid flow, both according to some embodiments of the present invention.

FIG. 8 includes FIGS. 8a, 8b and 8c, where FIG. 8a is a perspective view of a calibrated orifice member configured with upstream and downstream pressure taps, where FIG. 8b is a cross-sectional view of a valve having a valve body or housing configured to be arranged in, or form part of, piping with the calibrated orifice member shown in FIG. 8a configured in the valve and pivoted perpendicular (closed) to the direction of fluid flow, and where FIG. 8c is a side view of an orifice plate stem for configuring in the valve shown in FIG. 8b, all according to some embodiments of the present invention.

FIG. 9 includes FIGS. 9a, 9b and 9c, where FIG. 9a is a perspective view of a calibrated orifice member configured with upstream and downstream pressure taps, where FIG. 9b is a cross-sectional view of a valve having a valve body or housing configured to be arranged in, or form part of, piping with the calibrated orifice member shown in FIG. 9a configured in the valve and pivoted perpendicular (closed) to the direction of fluid flow, and where FIG. 9c is a view of the calibrated orifice member shown in FIG. 9a configured in the valve and pivoted parallel (open) to the direction of fluid flow, all according to some embodiments of the present invention.

FIG. 10 includes FIGS. 10a, 10b and 10c, where FIG. 10a is a perspective view of a calibrated orifice member configured with upstream and downstream pressure taps, where FIG. 10b is a cross-sectional view of a valve having a valve body or housing configured to be arranged in, or form part of, piping with the calibrated orifice member shown in FIG. 10a configured in the valve and pivoted perpendicular (closed) to the direction of fluid flow, and where FIG. 10c is a view of the calibrated orifice member shown in FIG. 10a configured in the valve and pivoted parallel (open) to the direction of fluid flow, all according to some embodiments of the present invention.

FIG. 11 includes FIGS. 11a, 11b and 11c, where FIG. 11a is a perspective view of a calibrated orifice member configured with upstream and downstream pressure taps, where FIG. 11b is a cross-sectional view of a valve having a valve body or housing configured to be arranged in, or form part of, piping with the calibrated orifice member shown in FIG. 11a configured in the valve and pivoted perpendicular (closed) to the direction of fluid flow, and where FIG. 11c is a view of the calibrated orifice member shown in FIG. 11a configured in the valve and pivoted parallel (open) to the direction of fluid flow, all according to some embodiments of the present invention.

FIG. 13 includes FIGS. 13a, 13b, 13c and 13d, where FIG. 13a is a perspective view of a calibrated orifice member configured with upstream and downstream pressure taps, where FIG. 13b is a cross-sectional view of a valve having a valve body or housing configured to be arranged in, or form part of, piping with the calibrated orifice member shown in FIG. 13a configured in the valve and pivoted perpendicular (closed) to the direction of fluid flow, and where FIG. 13c is a view of the calibrated orifice member shown in FIG. 13a configured in the valve and pivoted parallel (open) to the direction of fluid flow, and where FIG. 13d is a view of the calibrated orifice member shown in FIG. 13a configured in the valve and pivoted perpendicular (closed) to the direction of fluid flow similar to that shown FIG. 13b, all according to some embodiments of the present invention.

FIG. 14 shows a block diagram of a signal processor or signal processing module for implementing signal processing according to some embodiments of the present invention.

DETAILED DESCRIPTION OF THE INVENTION

FIGS. 1 to 7

Figure 3:
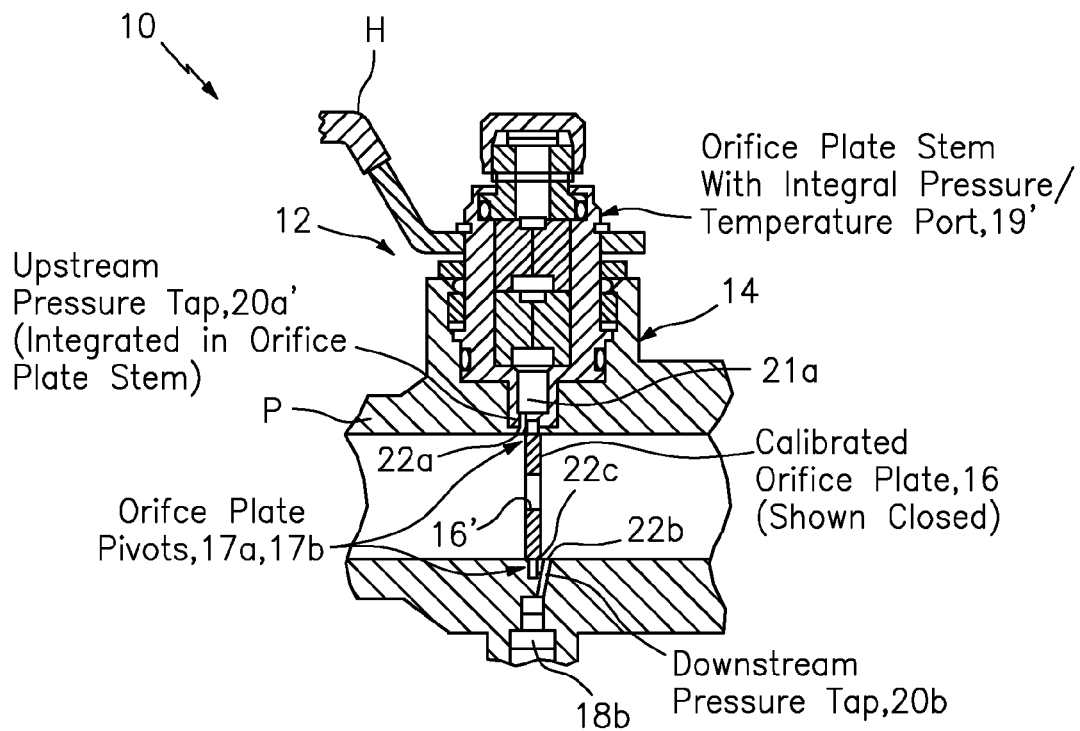
FIG. 3 is a cross-sectional view of a valve having a valve body or housing configured to be arranged in, or form part of, piping with an upper upstream pressure tap integrated in an orifice plate stem, with a lower downstream pressure tap configured in the piping, and with a calibrated orifice plate pivoted perpendicular (closed) to the direction of fluid flow, according to some embodiments of the present invention.

In general, FIGS. 1 and 3-7 all show cross-section views of apparatus generally indicate as 10 having a valve generally indicated as 12 having a valve body or housing generally indicated as 14 configured to be arranged in, or form part of, piping P having a fluid flow F.

In FIGS. 1 and 3-7, the valve body or housing 14 is configured with at least one pressure tap 20a, 20b arranged at at least one location 22a, 22b along the piping P to allow pressure of the fluid flow F of the piping P to be measured.

For example, in FIG. 1 the valve 12 includes an orifice plate 16 having an opening 16' and configured to rotate in the valve body or housing 14, e.g., on orifice plate pivots 17a, 17b as shown, on an axis A of rotation positioned at a different location 22c along the piping P than the at least one pressure tap 20a, 20b, for rotating between a first rotatable position (see FIG. 2a) for providing a normal fluid flow operation and a second rotatable position (see FIG. 2b) substantially perpendicular to the fluid flow F for providing a direct flow measurement of the fluid flow F. By way of example, the orifice plate 16 may be rotated by turning an actuator, such as a handle H as shown that is coupled to an orifice plate stem 19 connected to the orifice plate 16.

In operation, the direct flow measurement of the fluid flow F through the orifice plate 16 may be determined, e.g., using the signal processor or signal processing module 100 shown in FIG. 14 consistent with that set forth herein, based at least partly on signaling sensed by at least one pressure tap sensor 18a, 18b containing information about a measured pressure at the at least one pressure tap 20a, 20b when the orifice plate 16 is in the second rotatable position (see FIG. 2b).

As would be appreciated by one skilled in the art, the orifice plate stem 19 as shown herein may include other components consistent with that shown, including a stem component, an O-ring component, a locking mechanism for coupling the handle H to the stem, etc., which are not described in detail, since they do not form part of the underlying invention, and could be implemented by one skilled in the art without undue experimentation.

As would be appreciated by one skilled in the art, pressure tap sensors like elements 18a, 18b configured to sense fluid pressure and providing signaling containing information about the same, are known in the art, and the scope of the invention is not intended to be limited to any particular type or kind thereof either now known or later developed in the future.

In FIGS. 1 to 7, similar elements or components are typically referenced with similar reference numerals for the sake of consistency. Moreover, it is also understood that not every Figure will contain every reference label so as to reduce clutter in the drawing.

FIG. 3: The Integrated Pressure Tap

FIG. 3 shows an embodiment according to the present invention in which an upper upstream pressure tap 20a' may be integrated in the orifice plate stem 19' at an upstream location 22a along the piping P, and a lower downstream pressure tap 20b may be configured in the piping P at a downstream location 22b along the piping P. The calibrated orifice plate 16 has an opening 16' and may be pivoted perpendicular (closed) to the direction of fluid flow F, consistent with that shown in FIG. 2b. The calibrated orifice plate 16 may also be pivoted at the location 22c along the piping P, consistent with that also shown in FIG. 1a.

The orifice plate stem 19' may also be configured with a corresponding pressure tap/port 21a for providing and sensing the upstream fluid flow with an upstream pressure tap sensor like element 18a, consistent with that shown in FIG. 1a. See also that disclosed in the aforementioned application Ser. No. 13/681,628. The piping P may be configured with a downstream pressure tap sensor like element 18b for sensing the downstream fluid flow, e.g., consistent with that shown in FIG. 1a.

Consistent with that set forth herein, the scope of the invention is intended to include either the piping P or the valve housing or body 14 being configured with the upstream or downstream pressure taps. In FIG. 3, it is understood that some part of either the piping P or the valve housing or body 14 may be configured to allow for fluidic communication of the upstream fluid and the corresponding pressure tap/port 21a configured in the orifice plate stem 19'.

The scope of the invention is intended to include, and embodiments are envisioned in the spirit of the underlying invention in which, the lower downstream pressure tap 20b may be also configured as an integrated pressure tap, similar to, or consistent with, the integrated upper pressure tap 22a'.

Figure 4:
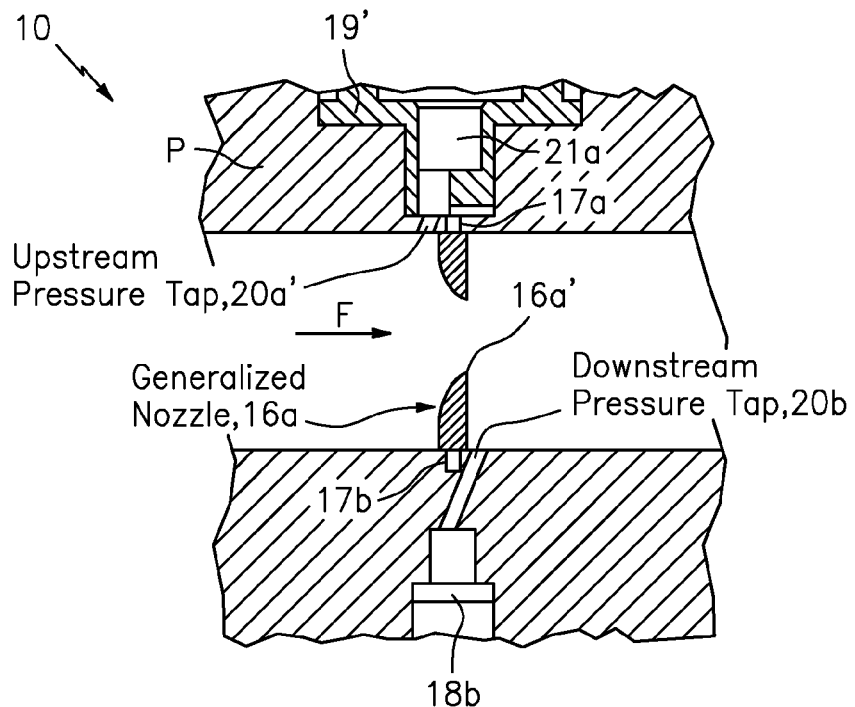
FIG. 4 is a cross-sectional view of a valve having a valve body or housing configured to be arranged in, or form part of, piping with an upper upstream pressure tap integrated in an orifice plate stem, with a lower downstream pressure tap configured in the piping, and with a generalized nozzle pivoted perpendicular (closed) to the direction of fluid flow, according to some embodiments of the present invention.

FIG. 4: the Generalized Nozzle

FIG. 4 shows an embodiment according to the present invention in which an upper upstream pressure tap 22a' is integrated in the orifice plate stem 19' and a lower downstream pressure tap 22b may be configured in the piping P, e.g., consistent with that shown in FIG. 3. In addition, the orifice plate may be configured as a generalized nozzle 16a having an opening 16a' and pivoted perpendicular (closed) to the direction of fluid flow, e.g., consistent with that shown in FIGS. 4 and 2b.

Figure 5:
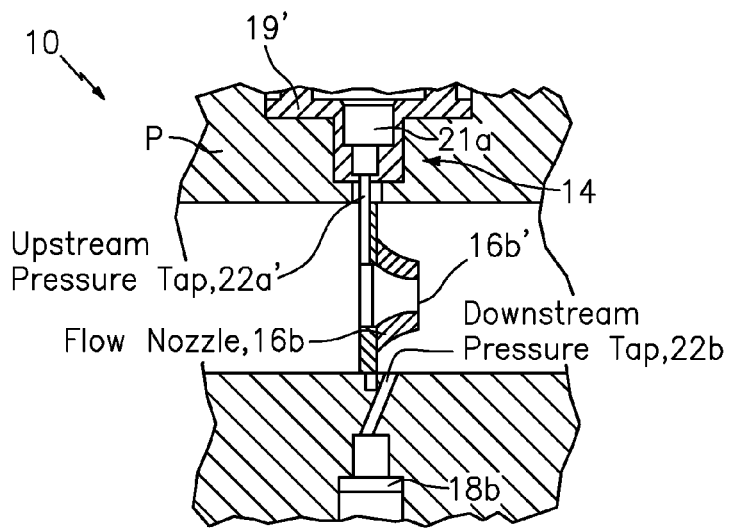
FIG. 5 is a cross-sectional view of a valve having a valve body or housing configured to be arranged in, or form part of, piping with an upper upstream pressure tap integrated in an orifice plate stem, with a lower downstream pressure tap configured in the piping, and with a flow nozzle pivoted perpendicular (closed) to the direction of fluid flow, according to some embodiments of the present invention.

FIG. 5: The Flow Nozzle

FIG. 5 shows an embodiment according to the present invention in which an upper upstream pressure tap 22a' may be integrated in the orifice plate stem 19' and a lower downstream pressure tap 22b may be configured in the piping P, e.g., consistent with that shown in FIGS. 3-4. In addition, the orifice plate may be configured as a flow nozzle 16b has an opening 16b' and pivoted perpendicular (closed) to the direction of fluid flow, consistent with that shown in FIGS. 5 and 2b. In FIG. 5, by way of example, the opening 16b' of flow nozzle 16b may be configured so as to be tapered inwardly, as shown.

Figure 6:
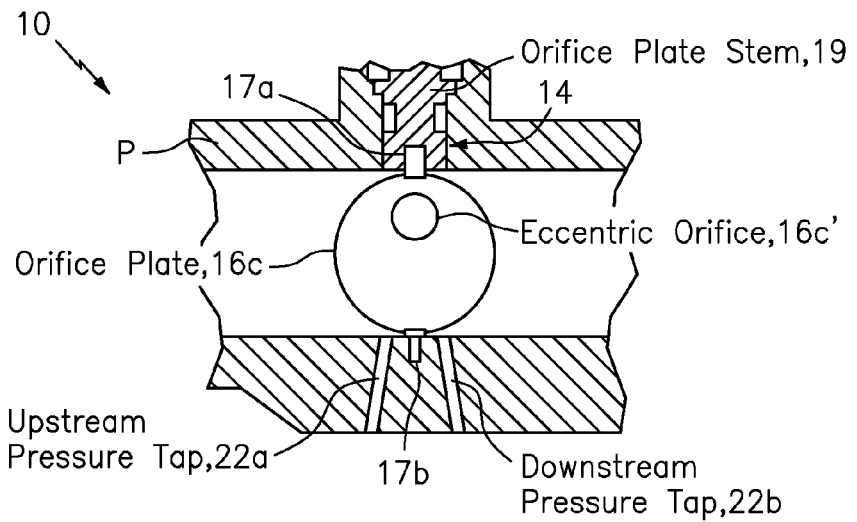
FIG. 6 is a cross-sectional view of a valve having a valve body or housing configured to be arranged in, or form part of, piping with lower upstream and downstream pressure taps configured therein and with a calibrated orifice plate with an eccentric orifice pivoted parallel (open) to the direction of fluid flow, according to some embodiments of the present invention.

FIG. 6: The Eccentric Orifice

FIG. 6 shows an embodiment according to the present invention in which the orifice plate may take the form of a calibrated orifice plate 16c that may be configured with an eccentric orifice 16c' pivoted parallel (open) to the direction of fluid flow F.

The eccentric orifice 16c' may be configured off-center as shown, and may include shapes such as a circle, as shown, as well as other types or kind of shapes, including oval, square, rectangular, triangular, etc. The scope of the invention is intended to include other types or kinds of shapes either now known or later formulated in the future.

The eccentric orifice 16c' may also be configured with a certain type of dimensionality and proportionality in relation to the calibrated orifice plate 16c as a whole, e.g., including being scaled larger or smaller than that shown in FIG. 6. Moreover, the scope of the invention is not intended to be limited to any particular type or kind of dimensionality or proportionality.

Figure 7:
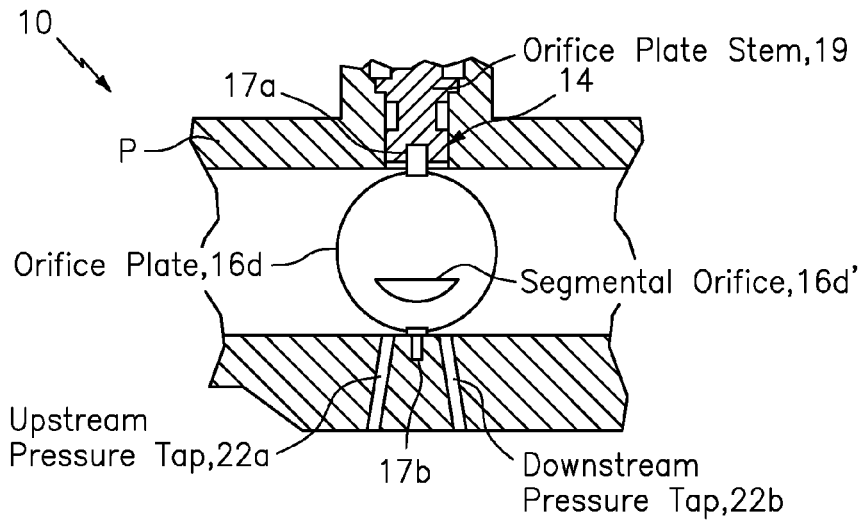
FIG. 7 is a cross-sectional view of a valve having a valve body or housing configured to be arranged in, or form part of, piping with lower upstream and downstream pressure taps configured therein and with a calibrated orifice plate with an eccentric segmental orifice pivoted parallel (open) to the direction of fluid flow, according to some embodiments of the present invention.

FIG. 7: The Segmented Orifice

FIG. 7 shows an embodiment according to the present invention in which the orifice plate may take the form of a calibrated orifice plate 16d that may be configured with a segmented orifice 16d' pivoted parallel (open) to the direction of fluid flow F.

The segmented orifice 16d' may be configured off-center as shown, and may include shapes such as a semi-circle, as shown, as well as other types or kind of shapes, including semi-oval, square, rectangular, triangular, etc. The scope of the invention is intended to include other types or kinds of shapes either now known or later formulated in the future.

The segmented orifice 16d' may be configured with a certain type of dimensionality and proportionality in relation to the calibrated orifice plate 16d as a whole, e.g., including being scaled larger or smaller than that shown in FIG. 7. Moreover, the scope of the invention is not intended to be limited to any particular type or kind of dimensionality or proportionality.

FIGS. 8 to 13

Similar to that shown in FIGS. 1 and 3-7, FIGS. 8-13 also all show cross-section views of apparatus generally indicate as 50 having a valve generally indicated as 52 having a valve body or housing generally indicated as 54 configured to be arranged in, or form part of, piping P having a fluid flow F.

However, in contrast to that shown in that shown in FIGS. 1 and 3-7, FIGS. 8-13 all show embodiments in which an orifice plate 56 is configured in relation to an orifice plate stem 59 having at least one integrated axial pressure tap 59a configured therein along the axis A of rotation to permit a pressure tap, e.g., configured in the orifice plate 56 to be measured. For example, in further contrast to that shown in that shown in FIGS. 1 and 3-7, the orifice plate 56 may also be configured with at least one tap member 56a, 56b having at least one integrated corresponding upstream or downstream tap 56a, 56b'' configured therein.

In FIGS. 8 to 13, similar elements are typically referenced with similar reference numerals for the sake of consistency. Moreover, it is also understood that not every Figure will contain every reference label so as to reduce clutter in the drawing.

FIG. 8

FIGS. 8a and 8b show an embodiment according to the present invention in which the calibrated orifice plate 56 has an opening 56' and may be configured with the at least one tap member 56a, 56b having the at least one integrated corresponding upstream or downstream tap 56a, 56b' configured or formed therein. The at least one tap member 56a, 56b, e.g., may be configured with an angled and beveled configuration or formation, consistent with that shown. The at least one integrated corresponding upstream or downstream tap 56a, 56b' may be configured to pass through the at least one tap member 56a, 56b, as shown.

In FIGS. 8a and 8b, the calibrated orifice plate 56 may include a channel portion 56c configured with a channel 56c' to be in fluidic communication with the at least one integrated axial pressure tap 59a of the orifice plate stem 59. The calibrated orifice plate 56 is shown pivoted perpendicular (closed) to the direction of fluid flow F, consistent with that shown in FIG. 2b.

FIG. 8c shows, by way of example, the orifice plate stem 59 for configuring in the valve 52 shown in FIG. 8b.

FIG. 9

FIGS. 9a to 9c show an embodiment according to the present invention in which the orifice plate may take the form of a calibrated orifice plate 56(1) has an opening 56(1)' and may be configured with the at least one tap member or portion 56(1)a, 56(1)b having the at least one integrated corresponding upstream or downstream tap 56(1)a', 56(1)b' configured or formed therein, consistent with that shown. By way of example, the at least one integrated corresponding upstream or downstream tap 56(1)a', 56(1)b' may be configured on an angle to pass through the at least one tap member or portion 56(1)a, 56(1)b, as shown.

In FIG. 9b, the calibrated orifice plate 56(1) is shown pivoted perpendicular (closed) to the direction of fluid flow F, consistent with that shown in FIG. 2b.

In FIG. 9c, the calibrated orifice plate 56(1) is shown pivoted parallel (open) to the direction of fluid flow F, consistent with that shown in FIG. 2a.

FIG. 10

FIGS. 10a to 10c show an embodiment according to the present invention in which the orifice plate may take the form of a calibrated orifice plate 56(2) has an opening 56(2)' and may be configured with the at least one tap member or portion 56(2)a, 56(2)b having the at least one integrated corresponding upstream or downstream tap 56(2)a', 56(2)b' configured or formed therein, consistent with that shown. By way of example, the at least one integrated corresponding upstream or downstream tap 56(2)a', 56(2)b' may be configured on an angle to pass through the at least one tap member or portion 56(2)a, 56(2)b, as shown.

In FIG. 10b, the calibrated orifice plate 56(2) is shown configured with O-ring channels 56(2)c for receiving O-rings 56(2)d as shown in FIGS. 10b and 10c for providing sealing functionality between the piping P or valve housing or body 54 and the calibrated orifice plate 56(2).

In FIG. 10b, the calibrated orifice plate 56(2) is shown pivoted perpendicular (closed) to the direction of fluid flow F, consistent with that shown in FIG. 2b.

In FIG. 10c, the calibrated orifice plate 56(2) is shown pivoted parallel (open) to the direction of fluid flow F, consistent with that shown in FIG. 2a.

FIG. 11

FIGS. 11a to 11c show an embodiment according to the present invention in which the orifice plate may take the form of a calibrated orifice plate 56(3) has an opening 56(3)' and may be configured with the at least one tap member or portion 56(3)a, 56(3)b having the at least one integrated corresponding upstream or downstream tap 56(3)a', 56(3)b' configured or formed therein, consistent with that shown. By way of example, the at least one integrated corresponding upstream or downstream tap 56(3)a', 56(3)b' may be configured on an angle to pass through the at least one tap member or portion 56(3)a, 56(3)b, as shown.

In FIG. 11b, the calibrated orifice plate 56(3) is shown pivoted perpendicular (closed) to the direction of fluid flow F, consistent with that shown in FIG. 2b.

In FIG. 11c, the calibrated orifice plate 56(3) is shown pivoted parallel (open) to the direction of fluid flow F, consistent with that shown in FIG. 2a.

In effect, the difference between the embodiment shown in FIG. 11 and that shown in FIG. 10 is based on using or not using O-ring channels 56(2)c and O-rings 56(2)d configured therein.

FIG. 12

Figure 12A:
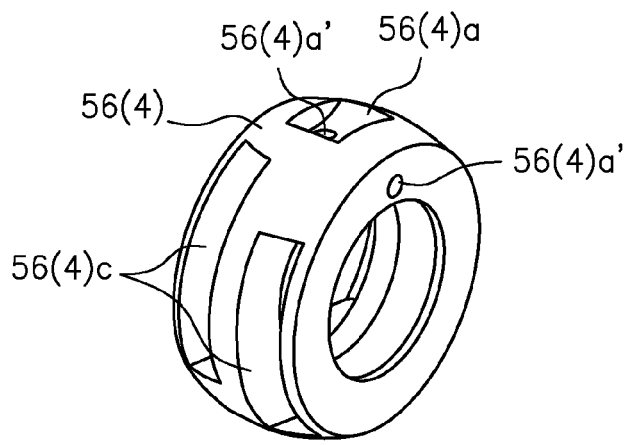
FIG. 12a is a perspective view of a calibrated orifice member configured with upstream and downstream pressure taps, where
Figure 12B:
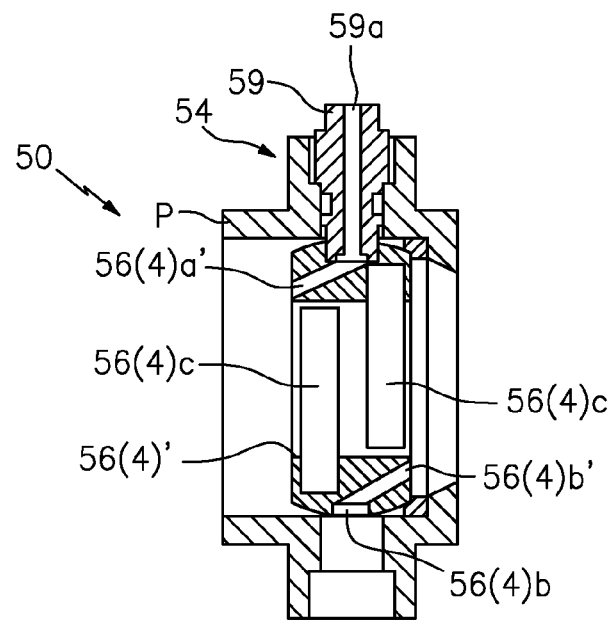
FIG. 12b is a cross-sectional view of a valve having a valve body or housing configured to be arranged in, or form part of, piping with the calibrated orifice member shown in FIG. 12a configured in the valve and pivoted perpendicular (closed) to the direction of fluid flow, and where
Figures 12, 12C:
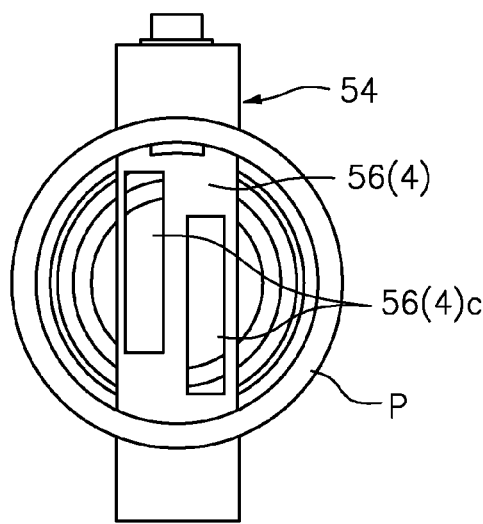
FIG. 12 includes FIGS. 12a, 12b and 12c, where
FIG. 12c is a view of the calibrated orifice member shown in FIG. 12a configured in the valve and pivoted parallel (open) to the direction of fluid flow, all according to some embodiments of the present invention.

FIGS. 12a to 12c show an embodiment according to the present invention in which the orifice plate may take the form of a calibrated orifice plate 56(4) has an opening 56(4)' and may be configured with the at least one tap member or portion 56(4)a, 56(4)b having the at least one integrated corresponding upstream or downstream tap 56(4)a', 56(4)b' configured or formed therein, consistent with that shown. By way of example, the at least one integrated corresponding upstream or downstream tap 56(4)a', 56(4)b' may be configured on an angle to pass through the at least one tap member or portion 56(4)a, 56(4)b, as shown.

In FIG. 12b, the calibrated orifice plate 56(4) is shown pivoted perpendicular (closed) to the direction of fluid flow F, consistent with that shown in FIG. 2b.

In FIG. 12c, the calibrated orifice plate 56(4) is shown pivoted parallel (open) to the direction of fluid flow F, consistent with that shown in FIG. 2a. In FIGS. 12a to 12c, the calibrated orifice plate 56(4) is shown configured with partially circumferential channels 56(4)c for providing the fluid flow through the orifice plate 56(4) when pivoted parallel (open), consistent with that shown in FIGS. 2b and 12c. FIG. 12 shows the calibrated orifice plate 56(4) configured with four partially circumferential channels 56(4)c, including two pairs on each side, although the scope of the invention is intended to include using other configurations, such as one partially circumferential channel on each side, or three partially circumferential channels on each side, etc. As best shown in FIG. 12c, the pairs of partially circumferential channels 56(4)c on each side are configured to be offset, e.g., so one partially circumferential channels 56(4)c (on the left as shown) is slightly higher than the other partially circumferential channels 56(4)c (on the right as shown). In FIG. 12c, the diametrically opposed offset pairs of partially circumferential channels 56(4)c on respective sides of the calibrated orifice plate 56(4) are configured to be substantially in registration with one another, as shown, so the fluid flow can pass through one diametrically opposed offset partially circumferential channels 56(4)c on one respective side of the calibrated orifice plate 56(4), then through the other diametrically opposed offset partially circumferential channels 56(4)c on the other respective side of the calibrated orifice plate 56(4).

The channels 56(4)c may be configured in the outer surface of the orifice plate 56(4) as shown, and may include shapes such as rectangular as shown, as well as other types or kind of shapes, including oval, square, triangular, etc. The scope of the invention is intended to include other types or kinds of shapes either now known or later formulated in the future.

The channels 56(4)c may be configured with a certain type of dimensionality and proportionality in relation to the orifice plate 56(4) as a whole, e.g., including being scaled larger or smaller than that shown in FIGS. 12a to 12c. Moreover, the scope of the invention is not intended to be limited to any particular type or kind of dimensionality or proportionality for providing the fluid flow through the orifice plate 56(4) when pivoted parallel (open), consistent with that shown in FIGS. 2b and 12c.

FIG. 13

FIGS. 13a to 13d show an embodiment according to the present invention in which the orifice plate may take the form of a calibrated orifice plate 56(5) has an opening 56(5)' and may be configured with the at least one tap member or portion 56(5)a, 56(5)b having the at least one integrated corresponding upstream or downstream tap 56(5)a', 56(5)b' configured or formed therein, consistent with that shown. By way of example, the at least one integrated corresponding upstream or downstream tap 56(5)a', 56(5)b' may be configured on an angle to pass through the at least one tap member or portion 56(5)a, 56(5)b, as shown.

In FIGS. 13b and 13d, the calibrated orifice plate 56(5) is shown pivoted perpendicular (closed) to the direction of fluid flow F, consistent with that shown in FIG. 2b.

In FIG. 13c, the calibrated orifice plate 56(3) is shown pivoted parallel (open) to the direction of fluid flow F, consistent with that shown in FIG. 2a. The piping P' (right side) is also shown configured with an inwardly tapered channel C' in comparison to the piping P (left side) having the non-tapered channel C.

FIG. 14: Signal Processor 100

According to the present invention, the apparatus 10 may also include a signal processor or signal processing module 100 shown in FIG. 14 that may be configured to receive signaling from the upstream and downstream pressure tap sensors 18a, 18b (see also FIG. 1) and to determine the direct flow measurement of the fluid flow, based at least partly on the signaling received. The signal processor 16 may also be configured to provide corresponding signaling containing information about the direct flow measurement of the fluid flow determined. The signal processor 100 may also be configured with a processor and at least one memory device including computer program code, the at least one memory device and the computer program code configured to, with the at least one processor, cause the signal processor at least to implement the signal processing functionality of the apparatus set forth above. A person skilled in the art would understand and appreciate how to implement such a signal processor to perform the aforementioned signal processing functionality without undue experimentation.

By way of example, the functionality of the signal processor 100 may be implemented using hardware, software, firmware, or a combination thereof. In a typical software implementation, the signal processor 100 would include one or more microprocessor-based architectures having at least one microprocessor, random access memory (RAM), read only memory (ROM), input/output devices and control, and data and address buses connecting the same. A person skilled in the art would be able to program such a microcontroller (or microprocessor)-based implementation to perform the functionality described herein without undue experimentation. The scope of the invention is not intended to be limited to any particular implementation using technology either now known or later developed in the future.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
   a valve having:
      a valve body or housing configured to be arranged in, or form part of, a piping having a fluid flow, and also configured with at least one pressure tap arranged at at least one location along the piping to allow pressure of the fluid flow of the piping to be measured; and
      an orifice plate having an orifice configured or formed therein, and configured to rotate in the valve body or housing on an axis of rotation positioned at a different location along the piping than the at least one pressure tap for rotating between a first rotatable position for providing a normal fluid flow operation and a second rotatable position substantially perpendicular to the fluid flow for providing a direct flow measurement of the fluid flow,
   so that the direct flow measurement of the fluid flow may be determined based at least partly on signaling sensed by at least one pressure tap sensor containing information about a measured pressure at the at least one pressure tap when the orifice plate is in the second rotatable position.

2. Apparatus according to claim 1, wherein the at least one pressure tap comprises an upstream pressure tap at an upstream location along the piping to allow upstream pressure of the fluid flow of the pipe to be measured and a downstream pressure tap at a downstream location along the piping to allow downstream pressure of the fluid flow of the pipe to be measured, so that the direct flow measurement of the fluid flow may be determined based at least partly on the signaling sensed by upstream and downstream pressure tap sensors containing information about a measured pressure differential between upstream and downstream pressure taps in relation to the flow coefficient of the calibrated orifice when the orifice plate is in the second rotatable position.

3. Apparatus according to claim 2, wherein the axis of rotation of the orifice plate is configured between upstream and downstream locations along the piping.

4. Apparatus according to claim 2, wherein the apparatus comprises a signal processor or processing module configured at least to:
   receive the signaling from upstream and downstream pressure tap sensors, and
   determine the direct flow measurement of the fluid flow, based at least partly on the signaling received.

5. Apparatus according to claim 1, wherein the orifice plate comprises an orifice plate stem having an integrated axial pressure tap configured therein along the axis of rotation to permit one pressure tap to be measured.

6. Apparatus according to claim 1, wherein
   the orifice plate comprises at least one integrated corresponding upstream or downstream tap configured therein; and the apparatus comprises an orifice plate stem having an integrated axial pressure tap configured therein along the axis of rotation to permit the at least one integrated corresponding upstream or downstream tap to be measured.

7. Apparatus according to claim 6, wherein the eccentricity of the calibrated orifice is based at least partly on, or in accordance with, a type of fluid flowing in the pipe, including where fluids with high concentrations of particulates may require that an eccentric orifice be used, including a segmental or quadrant radius type orifice.

8. Apparatus according to claim 1, wherein the orifice plate is configured as a ring-like structure having a thickness to substantially allow the fluid flow passed the orifice plate when rotated into the first rotatable position, the ring configured to form a calibrated orifice with a flow coefficient to allow the calibrated fluid flow through the orifice plate when rotated into the second rotatable position.

9. Apparatus according to claim 1, wherein the apparatus comprises an actuator, including a handle, configured to rotate the orifice plate between first and second rotatable positions.

10. Apparatus according to claim 1, wherein the orifice plate includes, or takes the form of, separate interchangeable orifice inserts that are configured to allow different flow rates and conditions to be measured.

11. Apparatus according to claim 1, wherein the orifice plate takes the form of a calibrated orifice plate configured to be eccentric to the diameter of the orifice plate.

12. Apparatus according to claim 1, wherein the orifice plate includes, or takes the form of, a flow nozzle or generalized nozzle.

13. Apparatus according to claim 1, wherein the orifice plate is configured with an integrated port in the axis of the orifice plate configured to permit at least one upstream or downstream pressure tap to be measured.

14. Apparatus according to claim 1, wherein the orifice plate comprises orifice plates member configured with corresponding upstream or downstream pressure taps in fluidic communication with the upstream and downstream pressure taps to determine the measured pressure differential.

15. Apparatus according to claim 1, wherein the orifice plate is configured with circumferential channels to allow fluid flow when the orifice plate in the first rotatable position for providing the normal fluid flow operation.

16. Apparatus according to claim 1, wherein the apparatus comprises a signal processor or processing module configured at least to:
   receive the signaling from at least one pressure tap sensor, and
   determine the direct flow measurement of the fluid flow, based at least partly on the signaling received.

17. Apparatus comprising a valve having:
   a valve body or housing configured to be arranged in a pipe having a fluid flow, and also configured with an upstream pressure tap at an upstream location to allow upstream pressure of the fluid flow of the pipe to be measured and a downstream pressure tap at a downstream location to allow downstream pressure of the fluid flow of the piping to be measured; and
   an orifice plate configured in the valve body or housing on an axis between the upstream location of the upstream pressure tap and the downstream location of the downstream pressure tap to rotate between a first rotatable position for providing a normal fluid flow operation and a second rotatable position substantially perpendicular to the fluid flow for providing a direct flow measurement of a calibrated fluid flow,
   so that the direct flow measurement of the fluid flow may be determined based at least partly on signaling sensed by upstream and downstream pressure tap sensors containing information about a measured pressure differential between upstream and downstream pressure taps in relation to the flow coefficient of the calibrated orifice when the orifice plate is in the second rotatable position.

* * * * *